United States Patent
Dizengof et al.

(10) Patent No.: US 10,242,554 B2
(45) Date of Patent: Mar. 26, 2019

(54) SYSTEM AND METHOD THEREOF FOR AUTOMATICALLY ROUTING A COMMUNICATION REQUEST ADDRESSED TO A PUBLIC SAFETY ANSWERING POINT (PSAP) TO A SUITABLE DISPATCH UNIT

(71) Applicant: Carbyne Ltd., Tel-Aviv (IL)

(72) Inventors: Alexander Dizengof, Tel Aviv (IL); Amir Elichai, Tel Aviv (IL)

(73) Assignee: Carbyne Ltd., Tel-Aviv (IL)

( * ) Notice: Subject to any disclaimer, the term of this patent is extended or adjusted under 35 U.S.C. 154(b) by 0 days.

(21) Appl. No.: 15/955,759

(22) Filed: Apr. 18, 2018

(65) Prior Publication Data

US 2018/0301017 A1 Oct. 18, 2018

Related U.S. Application Data

(60) Provisional application No. 62/486,470, filed on Apr. 18, 2017.

(51) Int. Cl.
| | | |
|---|---|---|
| *G08B 25/00* | (2006.01) | |
| *G08B 25/08* | (2006.01) | |
| *H04W 4/90* | (2018.01) | |
| *H04M 1/725* | (2006.01) | |
| *G08B 25/01* | (2006.01) | |
| *H04W 4/02* | (2018.01) | |

(52) U.S. Cl.
CPC ......... *G08B 25/006* (2013.01); *G08B 25/016* (2013.01); *G08B 25/08* (2013.01); *H04M 1/72536* (2013.01); *H04M 1/72569* (2013.01); *H04W 4/02* (2013.01); *H04W 4/90* (2018.02)

(58) Field of Classification Search
CPC ....... G08B 25/006; G08B 25/08; H04W 4/90; H04M 11/04; H04M 1/72569
USPC ..................................................... 340/539.22
See application file for complete search history.

(56) References Cited

U.S. PATENT DOCUMENTS

| | | | | |
|---|---|---|---|---|
| 9,147,336 | B2 * | 9/2015 | Schultz ................ | G08B 25/006 |
| 2007/0121797 | A1 * | 5/2007 | Goldman ............... | G08B 25/08 |
| | | | | 379/37 |
| 2010/0202368 | A1 * | 8/2010 | Hans ....................... | H04W 4/90 |
| | | | | 370/329 |
| 2017/0325056 | A1 * | 11/2017 | Mehta ..................... | H04W 4/90 |

* cited by examiner

*Primary Examiner* — John A Tweel, Jr.

(57) ABSTRACT

A computer implemented method of automatically routing incoming emergency calls to selected emergency dispatch centers, comprising using one or more processors for detecting one or more of a plurality of incoming emergency calls received from one or more client devices, acquiring via a communication network sensory data captured by one or more sensors associated with each client device and monitoring an environment of the client device, analyzing the sensory data to identify one or more environment parameters deduced from the analysis and automatically routing each of the incoming emergency calls to a selected one of a plurality of emergency dispatch centers according to the one or more environment parameters.

18 Claims, 3 Drawing Sheets

US 10,242,554 B2

SYSTEM AND METHOD THEREOF FOR AUTOMATICALLY ROUTING A COMMUNICATION REQUEST ADDRESSED TO A PUBLIC SAFETY ANSWERING POINT (PSAP) TO A SUITABLE DISPATCH UNIT

RELATED APPLICATION

This application claims the benefit of priority under 35 USC § 119(e) of U.S. Provisional Patent Application No. 62/486,470, filed on Apr. 18, 2017. The contents of the above applications are all incorporated by reference as if fully set forth herein in their entirety.

FIELD AND BACKGROUND OF THE INVENTION

The present invention, in some embodiments thereof, relates to automatically routing incoming emergency calls received at a joint emergency dispatch center to selected emergency dispatch centers, and, more specifically, but not exclusively, to automatically routing incoming emergency calls received at an emergency joint dispatch center to selected emergency dispatch centers based on analysis of sensory data acquired from originating client devices.

In order to simplify and expedite accesses to various emergency services, many countries have established joint emergency dispatch centers, for example, Public Safety Answering Points (PSAP) and/or the like such as, for example, the 911service (in the US), the 112 service (in Europe) which serve to receive incoming emergency calls relating to reports of any type of emergency event. Such joint emergency dispatch centers are, typically manned by dispatchers trained to briefly interrogate the reporters and assess the emergency events to decide based on the emergency events which emergency service is best suitable to respond to each of the reported emergency events and route the incoming emergency calls to the respective emergency service accordingly.

One of the key factors in handling and responding to emergency events is traced to the ability of the joint emergency dispatch centers to quickly and accurately route the incoming emergency calls to the appropriate dispatch centers, for example, police dispatch centers, medical services dispatch centers, fire department dispatch centers, municipal services dispatch centers and/or the like.

However, no matter how professional the dispatchers of the joint emergency dispatch centers may be, the response time to accepting and handling the incoming emergency calls may often be significantly high due to the limited number of dispatchers required to accept and serve potentially very high numbers of incoming emergency calls.

SUMMARY OF THE INVENTION

According to a first aspect of the present invention there is provided a computer implemented method of automatically routing incoming emergency calls to selected emergency dispatch centers, comprising using one or more processors for:

Detecting one or more of a plurality of incoming emergency calls received from one or more client devices.

Acquiring, via a communication network, sensory data captured by one or more sensors associated with one or more of the client devices and monitoring an environment of the respective client device.

Analyzing the sensory data to identify one or more environment parameters deduced from the analysis.

Automatically routing the one or more incoming emergency calls to a selected one of a plurality of emergency dispatch centers according to the one or more environment parameters.

According to a second aspect of the present invention there is provided a system for automatically routing incoming emergency calls to selected emergency dispatch centers, comprising:

A program store storing a code; and

One or more processors coupled to the program store for executing the stored code, the code comprising:

Code instructions to detect one or more of a plurality of incoming emergency calls received from one or more client devices.

Code instructions to acquire, via a communication network, sensory data captured by one or more sensors associated with the one or more of the client devices and monitoring an environment of the respective client devices.

Code instructions to analyze the sensory data to identify one or more environment parameters deduced from the analysis.

Code instructions to automatically route the one or more incoming emergency calls to a selected dispatch center of a plurality of emergency dispatch centers according to the one or more environment parameters.

At any given time the joint emergency dispatch center may receive an extremely high number of incoming emergency calls which may not be immediately accepted (served) due to limited personal resources, i.e. trained dispatchers. By automatically analyzing the sensory data acquired from the originating client devices, potential emergency events reported by the incoming emergency calls may be automatically estimated before the incoming emergency calls are accepted and automatically routed to selected dispatch centers determined to be most suitable to respond to the estimated potential emergency event. This may significantly improve the response time of the most suitable dispatch center for accepting the incoming emergency calls received from the reporter(s).

In a further implementation form of the first and/or second aspects, each environment parameter is a member of a group consisting of: a parameter related to the one or more client devices, a parameter related to a user of the one or more client device, a parameter related to interaction between the user and the one or more client device and a parameter related to a surroundings of the one or more client devices. Identifying the environment parameters relating to major aspects of the potential emergency event, i.e. the reporter, the client device, the surroundings of the reporter and/or the like may significantly improve accuracy of estimating the characteristics of the potential emergency event, i.e. type, nature and/or the like may allow effectively and accurately routing the incoming emergency call to a specific emergency dispatch center estimated to best serve the corresponding incoming emergency events.

In a further implementation form of the first and/or second aspects, each sensor is a member of a group consisting of: an imaging sensor, an audio sensor, a geolocation sensor, a motion sensor and a physical condition sensor monitoring a user of the one or more client devices. Using sensory data collected from a wide range of sensors may allow creating a comprehensive sensory data base which may be used to determine, identify and evaluate the environment parameters which in turn may allow an accurate evaluation of the of the characteristics of the potential emergency.

In a further implementation form of the first and/or second aspects, one or more sensors are integrated in the one or more client devices. Taking advantage of sensors readily available in the client device to capture the sensory data used to evaluate the potential emergency event may significantly reduce the effort, cost and/or resources needed to adopt the incoming emergency calls routing system since the need for specially deployed sensors may be avoided.

In a further implementation form of the first and/or second aspects, one or more sensors are integrated in one or more peripheral devices associated with a user of one or more of the client devices and operatively communicating with the one or more client devices through one or more communication channels. Taking advantage of sensors available other devices associated with the user (reporter), in particular wearable devices to capture the sensory data may significantly expand the sensory data base to include additional data that may not be directly available from the client device itself. The extended sensory data base may allow for a significantly improved identification of the environment parameters and hence a significantly improved evaluation of the potential emergency event.

In an optional implementation form of the first and/or second aspects, the sensory data is continuously collected from the one or more sensors and stored by the one or more client devices regardless of initiation of the one or more incoming emergency calls. Sensory data which is continuously captured, collected and stored regardless of initiation of emergency call from the client device, may allow access to sensory data captured prior to initiation of the emergency call. In many cases such data depicting the reporter, the client device and/or the surroundings of the client device prior to the call initiation may have significant value in understanding and/or responding to potential emergency event.

In an optional implementation form of the first and/or second aspects, one or more of the environment parameters are identified by one or more of the client devices. Identifying the environment parameter(s) locally at the client device may significantly reduce the computing load and/or computing time at a central routing thus significantly reducing the time for evaluating and estimating the potential emergency event(s) and hence reducing the response time for routing the respective incoming emergency call(s).

In an optional implementation form of the first and/or second aspects, one or more trained machine learning algorithms are applied to classify one or more environment parameters to a respective one of a plurality of potential emergency events, the routing of the one or more incoming emergency calls is based on selecting a dispatch center estimated as most suitable to respond to the respective potential emergency event estimated for the one or more incoming emergency calls. Applying the trained machine learning algorithm(s) to estimate the potential emergency event may allow for constant evolution of the routing system in adjusting to new and/or varying environment parameters to accurately classify the potential emergency events according to the identified environment parameters.

In an optional implementation form of the first and/or second aspects, identification data is acquired from the one or more of the client devices in conjunction with the sensory data, the identification data comprising one or more members of a group consisting of: an age of a user of the one or more client devices, a gender of the user, a name of the user, a telephone number associated with the at least one client device and an indication of a destination of the one or more incoming emergency calls. The identification information of the user (reporter) may be a major factor in estimating the characteristics of the potential emergency event and therefore routing the incoming emergency call(s) according to the identification information may be significantly more accurate.

In an optional implementation form of the first and/or second aspects, one or more of the incoming emergency calls is routed based on comparison of at least some of the identification data with stored identification data collected during one or more previous incoming emergency calls. By comparing the identification data relating to current incoming emergency calls to identification data relating to previous (past) incoming emergency calls may provide some insight(s) with respect to the reporter, with respect to the geographical area in which the reporter is currently located and/or the like and may hence improve the accuracy of estimating the potential emergency event and routing the respective incoming emergency call accordingly.

In an optional implementation form of the first and/or second aspects, one or more of the incoming emergency calls is routed according to a correlation of the one or more incoming emergency calls with one or more other incoming emergency calls received from one or more other client devices based on a common geolocation parameter identified for both the one or more incoming emergency calls and the one or more other incoming emergency calls. This may allow analyzing sensory data collected from a plurality of client devices capturing aspects, and/or elements of the potential emergency event from multiple different viewpoints.

In an optional implementation form of the first and/or second aspects, one or more of the incoming emergency calls is routed according to a predefined static routing associating one or more dialed numbers identified for one or more of the incoming emergency calls with one or more of the plurality of emergency dispatch centers. Using the static, routing of the incoming emergency call(s) may be significantly expedited since the need to estimate the type and/or characteristics of the potential emergency event may be avoided thus significantly reducing the overall response time to incoming emergency call(s).

In an optional implementation form of the first and/or second aspects, an event report record is generated and associated one or more of the incoming emergency calls. The event report record comprising at least some of the sensory data is forwarded to the selected dispatch center. The event report record comprising at least part of the sensory data may significantly improve the visibility and/or ability of the dispatchers at the selected emergency dispatch center to serve, handle and/or respond to the incoming emergency call(s).

In an optional implementation form of the first and/or second aspects, the event report record comprising at least some identification data acquired from the one or more client devices. Including the identification data or part thereof in the event report may further improve the ability of the dispatchers at the selected emergency dispatch center to serve, handle and/or respond to the incoming emergency call(s). Moreover, the identification data may be used by the selected emergency dispatch center to automatically route the respective incoming emergency call(s) to appropriate dispatchers.

In an optional implementation form of the first and/or second aspects, the event report record comprises a priority score calculated for the one or more incoming emergency calls based on the one or more environment parameters. The priority score calculated for one or more of the incoming emergency calls may be used by the selected emergency dispatch center to prioritize the incoming emergency calls routed to the selected emergency dispatch center and hence reduce the response time to incoming emergency calls associated with high severity and/or high urgency potential emergency events.

In an optional implementation form of the first and/or second aspects, the event report record comprises a reliability score calculated for the one or more incoming emergency calls based on one or more previous emergency calls received from a user of the one or more client devices. The reliability score calculated for one or more of the incoming emergency calls may be used by the selected emergency dispatch center to evaluate a probability that the potential emergency event(s) is a real one or not and hence further improve serving, handling and/or responding to the incoming emergency call(s).

In an optional implementation form of the first and/or second aspects, the event report record comprises a textual representation of one or more emergency events estimated based on the one or more environment parameters. The textual representation presented to dispatchers at the selected emergency dispatch center may significantly improve the ability of the dispatcher(s) to quickly identify the potential emergency event and take action(s) accordingly.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
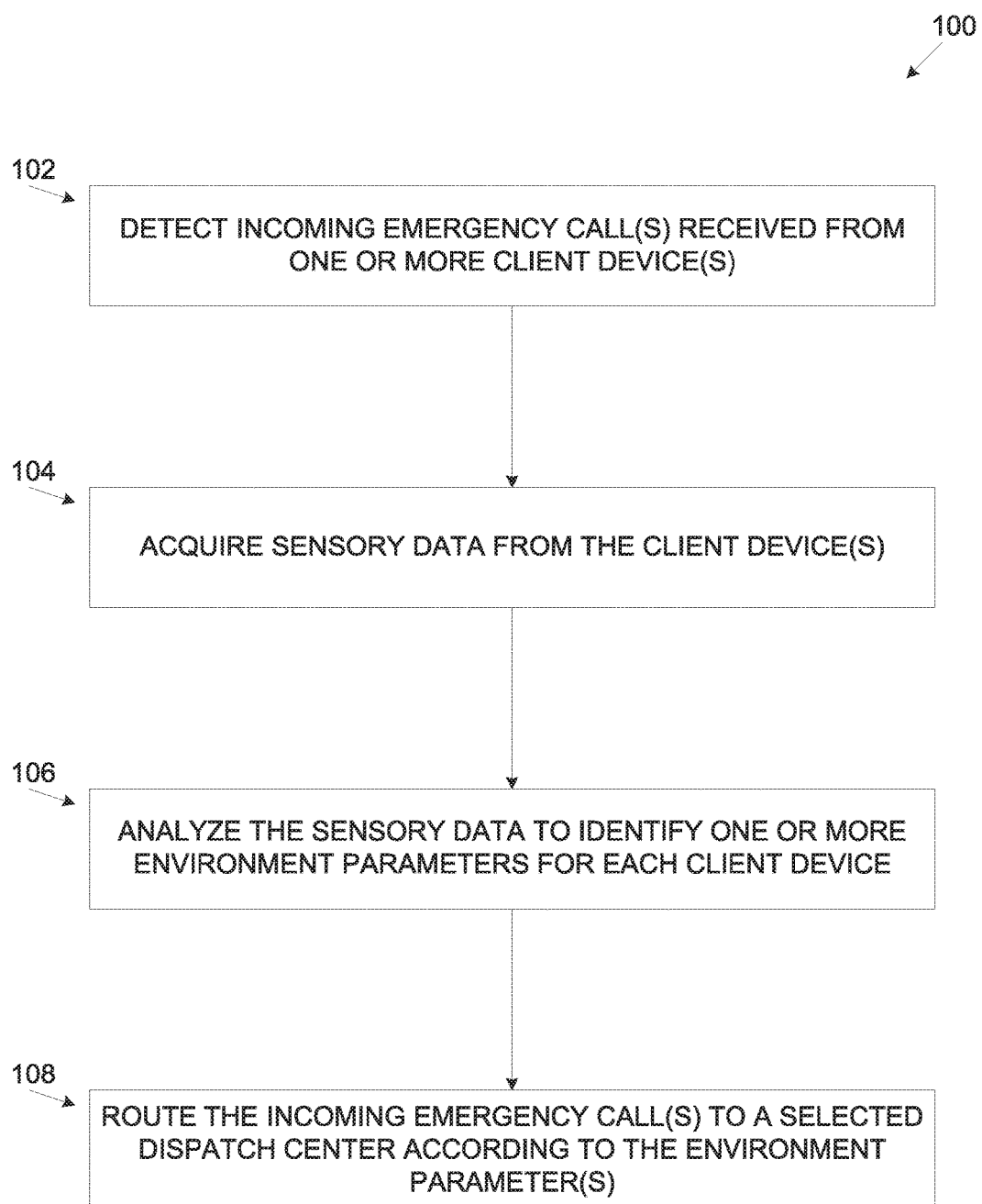
FIG. 1 is a flowchart of an exemplary process of automatically routing incoming emergency calls received at a joint emergency dispatch center to a selected dispatch center, according to some embodiments of the present invention.

The present invention, in some embodiments thereof, relates to automatically routing incoming emergency calls received at a joint emergency dispatch center to selected emergency dispatch centers, and, more specifically, but not exclusively, to automatically routing incoming emergency calls received at an emergency joint dispatch center to selected emergency dispatch centers based on analysis of sensory data acquired from originating client devices.

According to some embodiments of the present invention, there are provided methods and systems for automatically routing incoming emergency calls received at a joint emergency dispatch center, for example, a PSAP serving all incoming emergency calls to selected dispatch center(s) associated with specific emergency services, for example, the police, a medical service, a fire department, a municipal service and/or the like. The incoming emergency calls may be received from one or more of a plurality of originating client devices, for example, a cellular phone, a Smartphone, a tablet, a laptop and/or the like used by a one or more users (reporters) to initiate the incoming emergency calls to the joint emergency dispatch center in order to report of potential emergency events.

Sensory data captured by sensors monitoring and/or depicting the environment of the originating client devices may be acquired at the joint emergency dispatch center and analyzed to identify one or more environment parameters of the environment of the originating client devices. Based on the identified environment parameter(s), the potential emergency events corresponding to the incoming emergency calls may be evaluated, specifically the type of the potential emergency events and optionally one or more characteristics of the potential emergency events, for example, location, severity, urgency and/or the like.

One or more of the incoming emergency calls corresponding to the potential emergency event(s) may be then be routed from the joint emergency dispatch center to the selected dispatch center estimated to be best suitable to respond to the respective incoming emergency calls based on the type and/or characteristic(s) of the potential emergency event(s).

The incoming emergency call may be identified at the joint emergency dispatch center and/or by one or more Private Branch Exchanges (PBX) executing a PBX agent (e.g. an application, service, etc.) associated with the joint emergency dispatch center and adapted to identify the incoming emergency calls among a plurality of received calls. The incoming emergency calls may be detected by analyzing the incoming call, for example, determining that the dialed number of the incoming call is associated with an emergency service, for example, the PSAP (e.g. 911, 112, etc.), the police, a medical service, the fire department and/or the like. The dialed number may be identified, for example, using a Dialed Number Identification Service (DNIS) and/or the like to determine whether an incoming call is directed to an emergency service.

Once an incoming call is detected as an incoming emergency call and before accepting it (by a human dispatcher), the incoming emergency call may be directed to an incoming emergency calls routing system, for example, a server, a cloud service and/or the like which may establish a communication session with the originating client device to acquire the sensory data collected by the originating client device. Optionally, in particular in case one or more of the incoming emergency call is a Voice over Internet Protocol (VoIP) call which may include data, the sensory data and/or part thereof may be included in the respective incoming emergency call.

The sensory data may be captured by one or more sensors associated with the originating client device. The sensors may monitor and/or depict an environment of the originating client device. The sensors may be integrated in the originating client device and/or included in one or more peripheral devices which are operatively communicating with the originating client device, for example, a wearable device and/or the like. The sensory data may relate to the originating client device itself, to the user of the client device (reporter) and/or to the surroundings of the client device. The sensory data may include, for example, imagery data (images, video, etc.), audio data (sound, voice, speech, noise, etc.), motion data, geolocation data, physical condition data of the reporter (e.g. heartbeat rate, blood pressure, respiration rate, temperature, perspiration level, etc.), interaction data reflecting interaction between the reporter and the originating client device and/or the like.

The incoming emergency calls routing system may analyze the sensory data acquired from the originating client device to identify one or more environment parameters relating to the client device, to the reporter and/or to the surroundings of the client device. The environment parameter(s) deduced from the analysis may be indicative of the type, nature, severity and/or urgency of a respective potential emergency event that the reporter attempts to report about by initiating the emergency call. The incoming emergency calls routing system may further base the analysis on identification data (information) acquired from the originating client device, for example, an age of the reporter, a gender of the reporter, a name of the reporter, a telephone number associated with the client device, an indication of a destination number to which the respective incoming emergency call is directed (i.e. the emergency service the reporter attempts to contact) and/or the like.

Based on the environment parameter(s) and optionally on the identification data, the incoming emergency calls routing system may estimate the type of the potential emergency event and optionally estimate one or more characteristics of the potential emergency event, for example, location, severity, urgency and/or the like. The incoming emergency calls routing system may further apply one or more machine learning algorithms trained to classify the identified environment parameter(s) to a certain type of the potential emergency event.

The incoming emergency calls routing system may then route one or more of the incoming emergency calls to one or more selected dispatch center(s) estimated to be best suitable to respond to the respective incoming emergency calls based on the type and/or characteristic(s) estimated for each of the potential emergency event(s).

Optionally, the incoming emergency calls routing system correlates between. incoming emergency calls received from multiple client devices and possibly relating to the same potential emergency event. For example, based on the geographical location (geolocation) estimated for several originating client devices from which the incoming emergency calls are received, the incoming emergency calls routing system may identify that these client devices are located in close proximity to each other. The incoming emergency calls routing system may therefore analyze the sensory data acquired from at least some of these client devices to identify the environment parameter(s) and more accurately evaluate the potential emergency event, specifically, the type, the location, the severity and/or the urgency.

Optionally, the incoming emergency calls routing system analyzes sensory data captured prior to the initiation of the emergency call and acquired from the originating client device in case such sensory data is available. This may allow the incoming emergency calls routing system to identify and/or estimate one or more environment parameters relating to a time preceding the time when the reporter initiated the emergency call.

Optionally, the incoming emergency calls routing system routes one or more of the incoming emergency calls based on previous incoming emergency calls. The information relating to the previous incoming emergency calls may be stored in one or more local storage resources and/or remote storage resources accessible via a network.

Optionally, the incoming emergency calls routing system creates an event report record for one or more of the incoming emergency calls and associates the event report with the respective incoming emergency call(s). The event report may include at least some of the sensory data acquired from the originating client device. The event report may further include at least some of the identification data acquired from the originating client device.

Optionally, the incoming emergency calls routing system calculates a priority score for one or more of the incoming emergency calls based on the type of the respective emergency event and/or its characteristics estimated based on analysis of the environment parameter(s) identified for each incoming emergency call. The priority score may be further adjusted based on previous incoming emergency calls received in the past. The priority score may be included in the event report created for the respective incoming emergency call.

Optionally, the incoming emergency calls routing system calculates a reliability score for one or more of the incoming emergency calls based on the identification data acquired from the respective originating client device(s). In particular, the incoming emergency calls routing system may calculate the reliability score based on comparison of at least some of the identification data to identification data acquired during one or more previous emergency calls. The reliability score may be included in the event report created for the respective incoming emergency call.

Optionally, the incoming emergency calls routing system generates a textual representation, for example, a title, a description and/or the like for one or more of the potential emergency events reported by one or more of the incoming emergency calls. The textual representation may be included in the event report created for the respective incoming emergency call.

Automatically routing incoming emergency calls to the selected emergency dispatch centers may present significant advantages and benefits compared to current systems and methods for accepting incoming emergency calls at a joint emergency dispatch center.

First, at any given time the joint emergency dispatch center may receive an extremely high number of incoming emergency calls which may not be immediately accepted (served) due to limited personal resources, i.e. trained dispatchers. This may naturally present a major limitation since the time for routing the incoming emergency calls to the appropriate emergency service dispatch center may be significantly long thus increasing the overall response time to the incoming emergency calls. By automatically analyzing the sensory data acquired from the Originating client devices, identifying the environment parameter(s) to estimate the type and/or characteristics of the potential emergency event and routing the incoming emergency calls to the selected appropriate emergency dispatch center accordingly, the time for routing the incoming emergency calls may be significantly reduced thus significantly reducing the overall response time to the incoming emergency calls. Also, applying the trained machine learning algorithm(s) to estimate the potential emergency event may allow for constant evolution of the incoming emergency calls routing system in adjusting to new and/or varying environment parameters to accurately classify the potential emergency events according to the identified environment parameters.

Moreover, the event report record comprising at least part of the sensory data, the identification data, the environments parameter(s), the estimated emergency event and/or its characteristics generated and associated with at least some of the incoming emergency calls may significantly improve the visibility and/or ability of the dispatchers at the selected emergency dispatch center to serve, handle and/or respond to the incoming emergency call(s). The priority score and/or the reliability score calculated for one or more of the incoming emergency calls may be further used by the selected emergency dispatch center to evaluate the potential emergency event(s) and hence further improve serving, handling and/or responding to the incoming emergency call(s).

Furthermore, correlating between multiple incoming emergency calls potentially relating to the same emergency event may further improve the ability to accurately estimate and determine the type of the emergency event and optionally its characteristics thus improving the routing accuracy and hence reducing the response time to the incoming emergency calls.

Adopting, integrating and deploying the incoming emergency calls routing system in legacy existing joint emergency dispatch centers (e.g. PSAP) may be very simple and straight forward since only the PBX agent needs to be deployed on PBX(s) already available at the existing joint emergency dispatch centers. The PBX agent adapted to identify the incoming emergency calls among the plurality of incoming calls may forward the incoming emergency calls to the incoming emergency calls routing system. The time, cost and/or effort required to deploy the incoming emergency calls routing system may therefore be significantly low making the incoming emergency calls routing system an attractive solution to significantly improve the operation of the joint emergency dispatch center(s) and reduce the time required to route the incoming emergency calls to the selected specific emergency dispatch centers thus significantly improving the overall response time.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of automatically routing incoming emergency calls received at a joint emergency dispatch center to a selected dispatch center, according to some embodiments of the present invention. A process 100 may be executed at a joint emergency dispatch center, for example, a PSAP for routing automatically incoming emergency calls received from a plurality of client devices to a selected dispatch center, for example, a police dispatch, a medical dispatch, a fire department dispatch, a municipal dispatch and/or the like. Sensory data captured by sensors monitoring and/or depicting the environment of the originating client devices is acquired and analyzed to identify one or more environment parameters. The automatic routing is based on evaluating a type and/or characteristic(s) of potential emergency events reported by the incoming emergency calls and routing the respective incoming emergency calls to the selected dispatch center. The selected dispatch center is determined to be best suitable to respond to the respective incoming emergency calls based on. the type and/or characteristic(s) of potential emergency events.

Figure 2A:
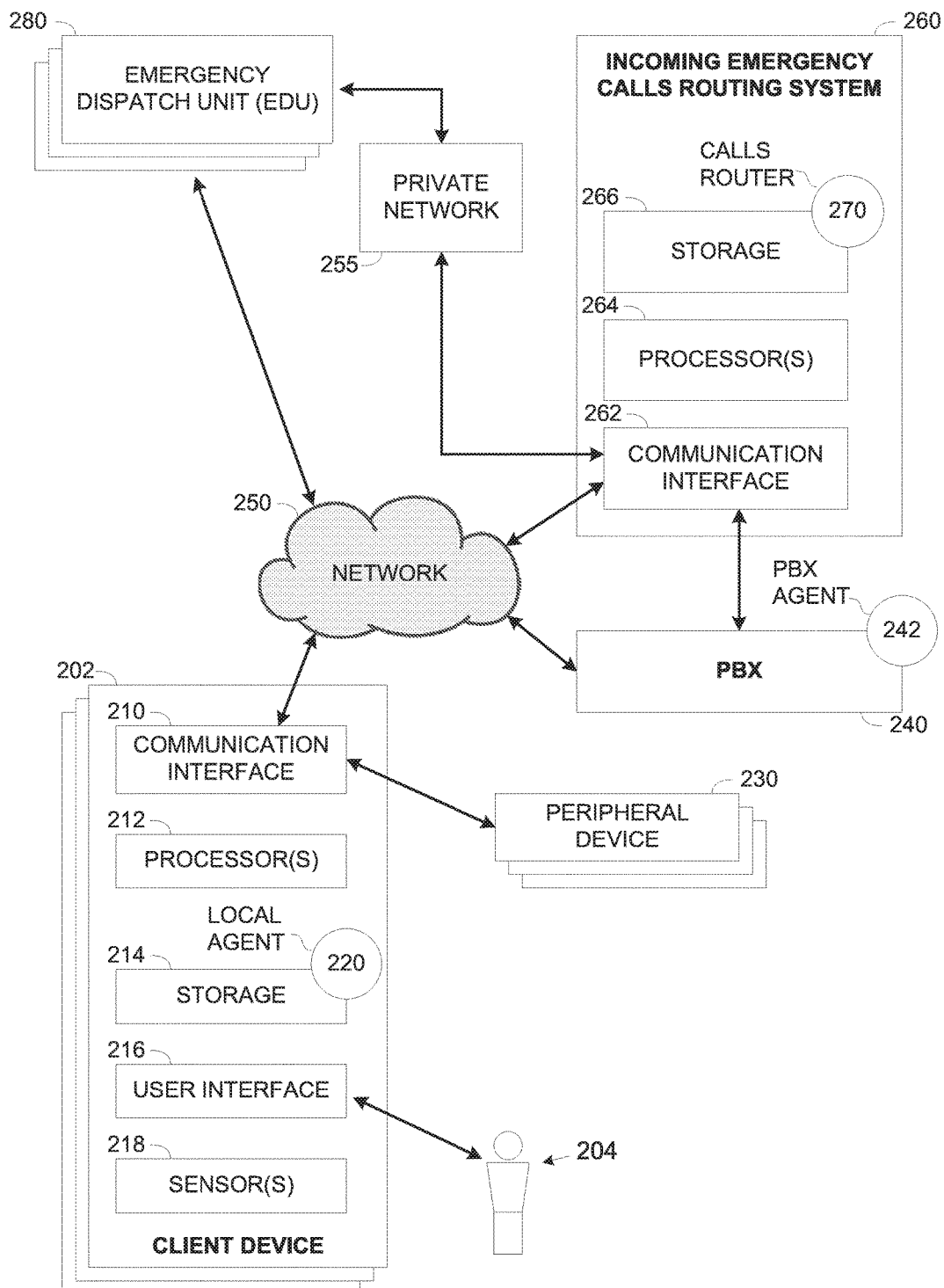
FIG. 2A and FIG. 2B are schematic illustrations of exemplary embodiments of a system for automatically routing incoming emergency calls received a joint emergency dispatch center to a selected dispatch center, according to some embodiments of the present invention.
Figure 2B:
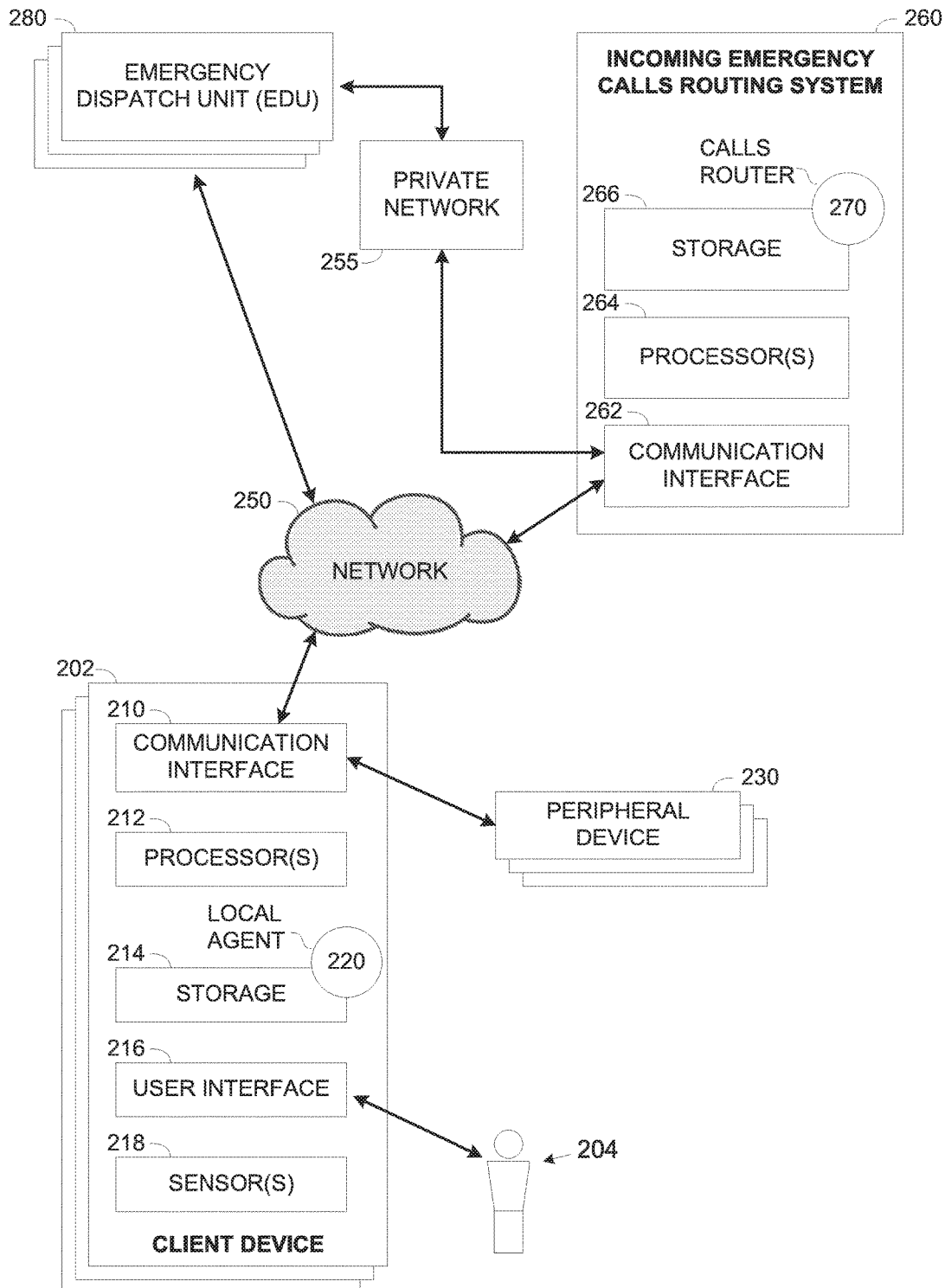

Reference is also made to FIG. 2A and FIG. 2B, which are schematic illustrations of exemplary embodiments of a system for automatically routing incoming emergency calls received at a joint emergency dispatch center to a selected dispatch center, according to some embodiments of the present invention. As shown in FIG. 2A and FIG. 2B, one or more client devices 202, for example, a Smartphone, a tablet, a laptop and/or the like may be used by one or more users (reporters) 204 to report of one or more potential emergency events by initiating emergency calls to an incoming emergency calls routing system 260 adapted to execute a process such as the process 100 for automatically routing the incoming emergency calls to one or more selected dispatch centers.

The incoming emergency calls routing system 260 may typically be associated with one or more joint emergency dispatch centers, for example, a PSAP and/or the like which is a central dispatch receiving incoming emergency calls relating to any type of emergency event. The incoming emergency calls routing system 260 may route the incoming emergency calls received at the PSAP to one or more Emergency Dispatch Units (EDU) 280, for example, a police dispatch, a medical dispatch, a fire department dispatch, a municipal dispatch and/or the like determined to best respond to the incoming emergency calls for further processing and handling of the incoming emergency calls.

Each of the client devices 202 may include a communication interface 210, a processor(s) 212 for executing a process such as the process 100 and storage 214 for storing program code (i.e. a program store) and/or data. The processor(s) 212 is coupled to the communication interface 210 and to the storage 214 through one or more interconnecting interfaces, for example, a bus, a communication interface, a switch fabric and/or the like.

The communication interface 212 may include one or more wired and/or wireless network interfaces for connecting to a network 250 comprising one or more networks, for example, a Local area Network (LAN), a Wireless LAN (WLAN), a Wide Area Network (WAN), a Municipal Area Network (MAN), a telephone network, a cellular network, the internet and/or the like. The processor(s) 212, homogenous or heterogeneous, may include one or more processing nodes arranged for parallel processing, as clusters and/or as one or more multi core processor(s). The storage 214 may include one or more non-transitory memory devices, either persistent non-volatile devices, for example, a Read Only Memory (ROM), a Flash array, a hard drive, a solid state drive (SSD), a magnetic disk and/or the like and/or one or more volatile devices, for example, a Random Access Memory (RAM) device, a cache memory and/or the like.

The client device(s) 202 may also include a user interface 216 comprising one or more human machine interfaces for interacting with the reporter 204, for example, a keyboard, a pointing device, a display, a touchscreen, a speaker, a microphone, a tactile interface and/or the like. Using the user interface 216, the reporter 204 may interact and operate the client device 202.

The client device(s) 202 may further include one or more sensors 218, for example, an imaging sensor (e.g. a camera, a night vision sensor, an infrared sensor, etc.), an audio sensor (e.g. a microphone, etc.), a motion sensor (e.g. an accelerometer, a gyroscope, etc.), a geolocation sensor (e.g. a GPS sensor, etc.) a tactile sensor and/or the like.

The communication interface 210 may further include one or more wired and/or wireless communication channels, for example, Bluetooth, WLAN (e.g. Wi-Fi), Universal Serial Bus (USB), Near Field Communication (NFC) and/or the like for connecting to one or more peripheral devices 230, for example, a wearable device such as, for example, a smart watch, a smart bracelet, an earphone, an activity tracker, a fitness device, a wearable imaging device (e.g. a camera), a wearable audio sensor (e.g. a microphone) and/or the like.

One or more of the peripheral devices 230 operatively communicating with the client device 202 may include one or more sensors, for example, an imaging sensor, an audio sensor, a geolocation sensor, a motion sensor, a physical condition sensor monitoring the physical condition signs (e.g. pulse, blood pressure, respiration rate, perspiration level, temperature, etc.) of the reporter 204 and/or the like.

The processor(s) 212 may execute one or more software modules, for example, a process, a script, an application, an agent, a utility, a tool and/or the like each comprising a plurality of program instructions stored in a non-transitory medium such as the storage 214 and executed by one or more processors such as the processor(s) 212. For example, the processor(s) 212 may execute a local agent 220 to collect sensory data from the sensors 216 and/or from the peripheral device(s) 230 and to communicate with the incoming emergency calls routing system 260.

In some embodiments of the present invention, as shown in FIG. 2A, the emergency call(s) initiated by the client device(s) 202 are directed to one or more PBXs 240, specifically, a PBX associated with one or more of the joint emergency dispatch centers, for example, the PSAP and/or the like. In such embodiments one or more incoming emergency calls may be initiated by one or more of the client devices 202 as voice calls directed trough the network 250 to the PBX 240. The PBX 240 is adapted to receive a plurality of incoming calls from the client device 202 and direct the incoming calls to their respective destinations. Moreover, the PBX 240 may execute a PBX agent 242 adapted to identify one or more incoming emergency calls among the plurality of incoming calls and direct the identified incoming emergency call(s) to the incoming emergency calls routing system 260.

The incoming emergency calls routing system 260, for example, a server, a computing node, a cluster of computing nodes and/or the like is adapted to execute a process such as the process 100 for automatically routing the incoming emergency call(s) received from the client devices 202 to selected dispatch center(s) determined to best respond to each of the incoming emergency calls. The incoming emergency calls routing system 260 may include a communication interface 262 such as the communication interface 210 for connecting to the network 250, a processor(s) 264 such as the processor(s) 212 and storage 266 such as the storage 214. The storage 266 may further comprise one or more network storage devices, for example, a storage server, a network accessible storage (NAS), a network drive, and/or the like. The storage 266 may be further utilized through one or more remote storage resource, for example, a database, a cloud storage and/or the like accessible via the network 250. The processor(s) 264 is coupled to the communication interface 262 and to the storage 266 through one or more interconnecting interfaces, for example, a bus, a communication interface, a switch fabric and/or the like.

The processor(s) 264 may execute one or more software modules, for example, a calls router 270 to execute the process 100, specifically to acquire the sensory data from the client device(s) 202, analyze the sensory data and route the incoming emergency calls to selected dispatch center(s) determined to best respond to the incoming emergency calls based on one or more environment parameters deduced from the analysis.

In some embodiments of the present invention, as shown in FIG. 2B, one or more of the incoming emergency calls initiated by the client device(s) 202 are directly received from by the incoming emergency calls routing system 260 via the network 250. In such embodiments one or more incoming emergency calls may be initiated by one or more of the client devices 202 as Voice over Internet Protocol (VoIP) calls which may be directed through the network 250 to the incoming emergency calls routing system 260.

Optionally, the incoming emergency calls routing system 260 and/or the calls router 270 executed by the incoming emergency calls routing system 260 are implemented as one or more cloud computing services, for example, Infrastructure as a Service (IaaS), Platform as a Service (PaaS), Software as a Service (SaaS) and/or the like such as, for example, Amazon Web Service (AWS), Google Cloud, Microsoft Azure and/or the like.

The incoming emergency calls routing system 260 may typically route the incoming emergency call(s) to one or more of the EDUs 280 through a private network 255, for example, an intranet and/or the like which may be highly immune against external cyber threats, for example, data interception, domain attacks, malicious message or call injection and/or the like. However, in some embodiments of the present invention, the incoming emergency calls routing system 260 may route the incoming emergency call(s) to the EDU(s) 280 through the network 250. In such cases, the transferred data and calls may be encrypted.

As shown at 102, the process 100 starts with the calls router 270 detecting one or more incoming emergency calls received from one or more originating client devices 202.

In case the incoming emergency calls are received from the PBX 240 as shown in FIG. 2A, the calls router 270 may detect any incoming call as an incoming emergency call since the PBX agent 242 executed by the PBX 240 may identify the incoming emergency calls among other incoming calls and direct (route) only the incoming emergency calls to the incoming emergency calls routing system 260. In case the incoming calls are directly routed to the incoming emergency calls routing system 260 as shown in FIG. 2B, the calls router 270 itself detects incoming emergency calls among other received incoming calls.

The calls router 270 and/or the PBX agent 242 may identify incoming calls as incoming emergency call(s) by checking the dialed number used for the incoming call, for example, the identifier provided by one or more services such as DNIS and/or the like. In case the dialed number is associated with an emergency service, for example, the PSAP, the police, a medical service, the fire department and/or the like, the calls router 270 and/or the PBX agent 242 may determine the respective incoming call as an emergency call. For example, assuming a certain incoming call is initiated to 911, the calls router 270 and/or the PBX agent 242 may determine the respective incoming call is an incoming emergency call addressed to the PSAP.

Optionally, the local agent 220 is used to initiate one or more of the emergency calls which are eventually directed to the calls router 270. The local agent may support initiating and establishing outgoing calls over one or more protocols, for example, a standard (regular) voice call, a VoIP call and/or the like. The local agent 220 may further support establishing one or more one way and/or two way data delivery sessions, multimedia transfer and/or the like over one or more links and/or networks available by the respective client device 202.

As shown at 104, after detecting an incoming emergency call, the calls router 270 may establish a communication session with the originating client device 202 which initiated the incoming emergency call, specifically with the local agent 220 executed by the originating client device 202 in order to acquire sensory data from the originating client device 202. The calls router 270 may identify the originating client device 202 by analyzing the Automatic Number Identification (ANI) extracted from the incoming emergency call. Using the ANI of the originating client device 202, the calls router 270 may obtain an address, for example, an IP address and/or the like of the originating client device 202 and establish a data communication session with the local agent 220. After establishing the communication session with the originating client device 202, the calls router 270 may acquire sensory data collected by the local agent 220.

In some embodiments, in particular, in case one or more of the incoming emergency calls are VoIP calls issued by the local agent(s) 220 and directly received by the calls router 270 at the incoming emergency calls routing system 260, the incoming emergency call may already include the sensory data and/or part thereof. To support such cases, the calls router 270 may be adapted to extract the sensory data from the incoming emergency call(s).

The local agent 220 may collect the sensory data from one or more sensors such as the sensor(s) 218 integrated in the originating client device 202 and/or the sensor(s) integrated in the peripheral device(s) 230 which may communicate with the originating client device 202 through one or more of the communication channels provided by the communication interface 210.

Based on the type, features, characteristics and/or capabilities of the sensor(s) 218 and/or the sensors available in the peripheral device(s) 230, the sensory data collected by the local agent 220 may include a plurality of sensory data items such as, for example:

Imagery data, comprising, for example, images, video and/or the like depicting the originating client device 202, the reporter 204 using the originating client device 202, the surrounding environment of the originating client device 202 and the reporter 204, other people in proximity to the originating client device 202 and/or the like.

Audio data comprising, for example, sound, voice, noise and/or the like captured at the surrounding environment of the originating client device 202, for example, sound and/or voice of the reporter 204, sound, speech and/or voice of other people, objects and/or events in the surrounding environment and/or the like.

Geolocation data comprising, for example, a geographical location of the originating client device 202, geographical coordinates of the current location of the originating client device 202, an address of the current location of the originating client device 202 and/or the like.

Motion data comprising, for example, motion of the originating client device 202, motion of the reporter 204 and/or the like.

Physical condition data reflecting physical condition signs of the reporter 204, for example, pulse (heartbeat rate), blood pressure, respiration rate, temperature, perspiration level and/or the like.

Interaction data reflecting interaction between the reporter 204 and the originating client device 202, for example, keyboard strokes speed, keyboard strokes accuracy and/or the like.

The calls router 270 may further acquire identification data from the local agent 220. The identification data may include personal details of the respective reporter 204, identification data of the originating client device 202 and/or the like. The identification data may include, for example, an age of the reporter 204, a gender of the reporter 204, a name of the reporter 204, a telephone number associated with the originating client device 202 and/or the like.

Personal details of the reporter 204 such as, for example, the age of the reporter 204, the gender of the reporter 204, the name of the reporter 204 and/or the like may be readily available to the local agent 220 from the storage of the originating client device 202, for example, from the storage 214. For example, the personal details may be stored in the storage 216 during the setup and/or registration for the local agent 220 when the reporter 204 may provide his personal details to the local agent 220 which may store the personal details in the storage 214. In another example, the local agent 220 may obtain the personal details of the reporter 204 from one or more services and/or application available at the client device 202, for example, a user account, an information service and/or the like. In order to maintain privacy, the local agent 220 may optionally request, during the setup process and/or on the first launch, the reporter 204 to allow the local agent 220 to access such services and/or applications. As it has access to the stored personal details, the local agent 220 may relieve the reporter 204 from the need to insert and/or provide his personal details in real time, i.e. during an emergency event, an operation which may be time consuming and therefore may present a major obstacle during the emergency event. Identification information relating of the originating client device 202 such as, for example, the telephone number associated with the originating client device 202 may be identified by the calls router 270 based on the ANI extracted from the incoming emergency call.

Typically, the local agent 220 may start collecting the sensory data in response to the request of the calls router 270 to establish the communication session for acquiring the sensory data. In case the sensory data is provided to the calls router 270 as part of the emergency call, the sensory data may include real-time sensory data collected by the local agent 220 during the time of initiating the emergency call. However, the local agent 220 may continuously and/or periodically collect the sensory data and/or part thereof regardless of the emergency call initiation and/or regardless of any reported event. The local agent 220 may store the collected sensory data, for example, in the storage 214. In such case, at the time of initiating the emergency call and/or while communicating with the calls router 270, the local agent 220 may provide sensory data collected prior to the initiation of the emergency call.

As shown at 106, the calls router 270 analyzes the sensory data to identify one or more environment parameters relating to a potential emergency event the reporter 204 attempts to report by initiating the emergency call. The environment parameters may include one or more parameters relating to, for example, the originating client device 202, the reporter 204, an interaction between the reporter 204 and the originating client device 202, surroundings of the originating client device 202 and/or the like.

The environment parameters relating to the originating client device 202 may include, for example, a location of the originating client device 202 identified by analyzing the geolocation data available in the sensory data.

The environment parameters relating to the reporter 204 may include, for example, a respiration rate of the reporter 204 identified by analyzing, for example, audio data available in the sensory data. The inhale and/or exhale sounds of the reporter 204 breathing may be analyzed to identify the respiration rate. Additionally and/or alternatively, the respiration rate of the reporter 204 may be identified by analyzing respiration rate readings available in the physical condition data which may be captured, for example, by a sensor integrated in one or more of the peripheral devices 230. In another example, the environment parameters relating to the reporter 204 may include the pulse (heartbeat rate) of the reporter 204 identified by analyzing pulse readings available in the physical condition data which may be captured, for example, by a sensor integrated in one or more of the peripheral devices 230, for example, a smart bracelet, a fitness bracelet and/or the like.

The environment parameters relating to the interaction between the reporter 204 and the originating client device 202 may include, for example, a motion of the originating client device 202 identified by analyzing the motion data available in the sensory data. The motion may be indicative of actions of the reporter 204, for example, walking, running, jumping, struggling and/or the like. In another example, environment parameters relating to the interaction between the reporter 204 and the originating client device 202 may include a keyboard strokes speed, frequency, accuracy and/or the like identified by analyzing the interaction data available in the sensory data.

The environment parameters relating to the surroundings of the originating client device 202 may include, for example, an estimation of an emergency event, for example, an accident, a medical emergency, a potential crime (e.g. a terror attack, a car theft, a burglary, a fight, a murder, a kidnap, a sexual harassment and/or attack, etc.) a public disorder (e.g. a strike, a vandalism act, etc.) and/or the like. The calls router 270 may estimate such emergency events by analyzing one or more data items available in the sensory data, for example, an image, a video stream, a sound, a voice, a speech and/or the like which are captured by the sensor(s) 218 and or the sensors of the peripheral device(s) 230 depicting the surroundings of the originating client device 202. For example, the calls router 270 may identify gun fire by analyzing the audio sensory data and estimate a firearm incident. In another example, the calls router 270 may identify environment parameter(s) indicative of, for example, a fire, a car accident, car theft event, a terror attack and/or the like by analyzing the image(s) and/or the video stream. In another example, the calls router 270 may identify environment parameter(s) indicative of one or more persons involved in a car theft event, a terror attack and/or the like by analyzing the image(s) and/or the video stream. Analyzing the image(s) and/or the video stream, and optionally the audio data, the calls router 270 may further identify a location, a path, a runaway direction and/or the like of one or more persons involved in the car theft event, a terror attack and/or the like. In another example, the calls router 270 may identify environment parameter(s) indicative of, for example, a heart attack, a stroke and/or the like a certain reporter 204 is currently experiencing by analyzing the physical condition signs of the certain reporter 204 as reflected in the physical condition sensory data.

Optionally, the calls router 270 analyzes sensory data captured prior to the initiation of the emergency call by the originating client device 202 in case such sensory data is available. This may allow the calls router 270 to identify and/or estimate one or more environment parameters relating to a time preceding the time when the reporter 204 initiated the emergency call.

Optionally, one or more of the originating client devices 202, specifically the respective local agent(s) 220 analyze their respective sensory data to identify one or more of the environment parameters relating to a potential emergency event the reporter 204 attempts to report by initiating the emergency call. The local agent(s) 220 may apply the same methods, techniques and/or algorithms as done by the calls router 270 to identify the environment parameter(s). In such case, the calls router 270 may acquire the environment parameter(s) from the respective local agent(s) 220 and use the acquired environment parameter(s) to estimate the respective potential emergency event the reporter 204 wishes to report.

Based on the identified and/or estimated environment parameter(s), the calls router 270 estimates the type of the potential emergency event the reporter 204 attempts to report and/or one or more characteristics of the estimated potential emergency event. For example, based on the identified environment parameter(s), the calls router 270 estimates the potential emergency event as a car accident with multiple injuries at a certain location. In another example, the calls router 270 estimates the potential emergency event as a burglary in progress to a house where the reporter 204 is currently located. Based on the physical conditions environment parameter(s) relating to the reporter 204, the calls router 270 may further detect that the reporter 204 is under major stress. In another example, the calls router 270 estimates the potential emergency event as a burglary in progress to a house where the reporter 204 is currently located.

Optionally, the calls router 270 applies one or more machine learning methods, techniques and/or algorithms trained to classify the identified environment parameters to respective potential emergency events. For example, using the machine learning algorithm(s) applied to the environment parameter(s), for example, gun fire, people screams, identified weapon(s) and/or the like, the calls router 270 may estimate a certain potential emergency event as a terror attack. In another example, using the machine learning algorithm(s) applied to the environment parameter(s), for example, a car wreck, cries for help from a wounded person(s) and/or the like, the calls router 270 may estimate a certain potential emergency event as a car accident with injured person(s). In another example, using the machine learning algorithm(s) applied to the environment parameter(s), for example, certain physical condition signs and/or the like, the calls router 270 may estimate a certain potential emergency event as a medical emergency, for example, an injury, a heart attack, a stroke and/or the like.

Optionally, the calls router 270 generates an event report record for one or more of the incoming emergency calls and associates each event report record with its respective incoming emergency call. For example, the calls router 270 may assign the event report record with an identifier reflecting the ANI extracted from the receptive incoming emergency call. In another example, the calls router 270 may assign a common identifier to the event report record and its receptive incoming emergency call.

The event report record may include at least some of the sensory data acquired from the originating client device 202 which initiated the respective incoming emergency call. The event report record may further include at least some of the identification data acquired from the originating client device 202 which initiated the respective incoming emergency call.

Optionally, the calls router 270 calculates a priority score for one or more of the incoming emergency calls based on the respective emergency event and/or its characteristics estimated based on analysis of the environment parameter(s) identified for each incoming emergency call. For example, the calls router 270 may assign a high priority score to incoming emergency calls corresponding to higher severity emergency events, for example, emergency events in which life is at risk, for example, a fire, a kidnap, a car accident and/or the like. In contrast, the calls router 270 may assign a low priority score to incoming emergency calls corresponding to potential emergency events of lesser consequences, for example, water pipe rapture and flooding, public property vandalism, a car accident with no injuries, a lost pet and/or the like. In another example, the calls router 270 may assign a high priority score to incoming emergency calls corresponding to emergency events which are in progress, for example, a fire, a car theft, a kidnap and/or the like. In contrast, the calls router 270 may assign a low priority score to incoming emergency calls corresponding to potential emergency events which ended, for example, a bank robbery where the robbers already left the area and/or the like. The calls router 270 may include the calculated priority score in the event report record associated with one or more of the incoming emergency calls.

Optionally, the calls router 270 calculates the priority score for one or more of the incoming emergency calls based on previous incoming emergency calls received in the past from one or more client devices 202 and/or one or more reporters 204. The information relating to the previous incoming emergency calls may be stored in one or more store resources, for example, the storage 266 and/or the remote storage resources accessible via the network 250, i.e. the database, the cloud storage and/or the like. For example, assuming a certain incoming emergency call is received from a client device 202 identified to be located in an area known (based on previous emergency calls) to have a high crime rate, the calls router 270 may therefore assign a higher priority score to this certain incoming emergency call.

Optionally, the calls router 270 calculates a reliability score for one or more of the incoming emergency calls based on the identification data acquired from the respective originating client device(s) 202. In particular, the calls router 270 may calculate the reliability score based on comparison of at least some of the identification data to identification data acquired during one or more previous emergency calls and stored in the storage 266 and/or in one or more remote storage resources, for example, a storage server, a cloud storage and/or the like accessible via the network 250. For example, assuming a certain incoming emergency call is received from a certain client device 202 having a certain ANI. Further assuming that based on analysis of records of previous incoming emergency calls, the calls router 270 identifies that several incoming emergency calls which were received in the past from the same certain client device 202 were found to be fraudulent calls. In such case the calls router 270 may assign a low reliability score to the certain incoming emergency call.

Optionally, the calls router 270 generates a textual representation, for example, a title, a description and/or the like for one or more of the potential emergency events reported by one or more of the incoming emergency calls. For example, assuming a certain potential emergency event is estimated by the calls router 270 as a house fire event. The calls router 270 may generate a title "house fire" and associate the title with the respective incoming emergency call corresponding to the certain potential emergency event. In another example, assuming a certain potential emergency event is estimated by the calls router 270 as a kidnap event. The calls router 270 may generate a title "kidnap" and associate the title with the respective incoming emergency call corresponding to the certain potential emergency event.

Optionally, the calls router 270 correlates together one or more incoming emergency calls received from multiple client devices 202 and possibly relating to the same potential emergency event. For example, based on a geolocation environment parameter(s) identified and/or estimated for two certain originating client devices 202, the calls router 270 may identify that the two certain originating client devices 202 are located in close proximity to each other. The calls router 270 may therefore analyze the sensory data acquired from both certain originating client devices 202 to identify the environment parameters and more accurately evaluate and/or estimate the potential emergency event type and/or characteristic(s). The calls router 270 may further adjust the priority score and/or the reliability score calculated for each of the correlated incoming emergency calls. For example, the calls router 270 may increase the priority score calculated for a plurality of correlated incoming emergency calls relating to the same potential emergency event since the emergency event may be a large scale event involving a plurality of people and/or reporters 204. In another example, the calls router 270 may increase the reliability score calculated for the correlated incoming emergency calls since multiple incoming emergency calls relating to the same potential emergency event may significantly increase the probability that the potential emergency event is a genuine event.

As shown at 108, based on the potential emergency event(s)' type and/or characteristic(s) estimated based on the environment parameter(s) identified for one or more incoming emergency calls, the calls router 270 automatically routes the respective incoming emergency call(s) to one or more selected EDUs 280 estimated to be best suitable for responding to the respective incoming emergency call(s).

For example, assuming the calls router 270 estimates that a certain potential emergency event reported by a certain incoming emergency call is shooting emergency event, a terrorist emergency event, a burglary emergency event and/or the like, the calls router 270 may route a certain incoming emergency call to an EDU 280 associated with the police. In example, assuming the calls router 270 estimates that a certain potential emergency event reported by a certain incoming emergency call is a fire emergency event, the calls router 270 may route a certain incoming emergency call to an EDU 280 associated with the fire department. In another example, assuming the calls router 270 estimates that a certain potential emergency event reported by a certain incoming emergency call is a heart attack emergency event, the calls router 270 may route a certain incoming emergency call to an EDU 280 associated with the medical service(s). In another example, assuming the calls router 270 estimates that a certain potential emergency event reported by a certain incoming emergency call is a sewage spillage emergency event, the calls router 270 may route a certain incoming emergency call to an EDU 280 associated with the municipal service(s). In another example, assuming the calls router 270 estimates that a certain potential emergency event reported by a certain incoming emergency call takes place at a certain geographical location, the calls router 270 may route a certain incoming emergency call to an EDU 280 assigned to handle emergency events in an area containing the certain geographical location identified for the certain potential emergency event. Moreover, the geographical area covered by the services of the joint emergency dispatch center (e.g. the PSAP) may be segmented to a plurality of segments, for example, through polygon mapping. One or more EDUs 280 may be associated with each of the geographic segments. In case the calls router 270 estimates that a certain potential emergency event reported by a certain incoming emergency call takes place at a certain geographical location located with a certain geographical segment (polygon), the calls router 270 may route a certain incoming emergency call to an EDU 280 associated with the certain geographical segment.

Optionally, the calls router 270 routes one or more of the incoming emergency calls to the selected EDU(s) 280 based on the identification data acquired from one or more of the originating client devices 202. In particular, the calls router 270 may route the incoming emergency call(s) based on comparison of at least some of the identification data to identification data acquired during one or more previous emergency calls and stored in the storage 266 and/or in one or more of the remote storage resources accessible via the network 250. For example, assuming a certain incoming emergency call is received from a certain client device 202 having a certain ANI and/or associated with a certain name of the reporter 204. Further assuming that based on analysis of previous incoming emergency calls, the calls router 270 identifies that several incoming emergency calls received in the past from the same certain client device 202 related to reports of domestic (house) quarrels. In such case the calls router 270 may route the certain incoming emergency call to the police EDU 280 and/or the medical service EDU 280. In another example, assuming a certain incoming emergency call is received from a certain client device 202 having a certain ANI and/or associated with a certain name of the reporter 204. Further assuming that based on analysis of previous incoming emergency calls, the calls router 270 identifies that several incoming emergency calls received in the past from the same certain client device 202 related to reports of a severe medical condition. In such case the calls router 270 may route the certain incoming emergency call to the medical service EDU 280.

Optionally, the calls router 270 routes routing one or more of the incoming emergency calls to the selected EDU(s) 280 according to a predefined static routing which predefines an association between certain dialed number(s) and certain emergency dispatch center(s). The static routing may predefine routing of one more certain dialed numbers are automatically to respective certain EDUs 280 associated with specific dispatch emergency centers, for example, the police dispatch center, the medical service dispatch center, the fire department dispatch center and/or the like. In case the calls router 270 identifies the dialed number of one or more incoming emergency calls are predefined by the static routing, the calls router 270 routes the respective incoming emergency call(s) to the respective EDU 280 defined by the static routing. The dialed number may be identified using one or more techniques, for example, using the DNIS of the incoming emergency call(s). For example, assuming the phone number of a certain police dispatch center in a certain geographical area is 1-234-5678. In case the calls router 270 identifies a certain incoming emergency call is directed to the number 1-234-5678, the calls router 270 may direct the certain incoming emergency call to the certain police dispatch center. Moreover, in case the client device 202 executes an emergency application, the emergency application may be configured to present to the user 204 one or more dialing numbers each associated with a certain one of the plurality of emergency dispatch centers. When the user presses one of the buttons, the client device 202 may initiate an emergency call directed to a specific number (dialed number) of the EDU 280 associated with the respective certain emergency dispatch center.

The calls router 270 may route the incoming emergency call(s) to the selected emergency dispatch centers, i.e. the selected EDUs 280 using one or more infrastructures, protocols and/or systems used by the EDUs 280. For example, assuming the joint emergency dispatch center, i.e. the PSAP employs a selective routing (selective router) system(s) and/or protocol(s). In such case the routing policy of the selective router may be configured and/or adjusted to allow the calls router 270 to route one or more of the incoming emergency calls to selected emergency dispatch center(s) determined to best respond to the incoming emergency call(s). In another example, assuming the joint emergency dispatch center, i.e. the PSAP utilizes an NG911 (Next-Gen 911) protocol such as the Emergency Services Internet Protocol Networks (ESInet) employing, for example, i3 Emergency Services Routing Proxy (ESRP) infrastructure(s) and/or protocol(s). In such case one or more components of the i3 ESRP may be configured and/or adjusted to define a routing policy allowing the calls router 270 to route one or more of the incoming emergency calls to selected emergency dispatch center(s) determined to best respond to the incoming emergency call(s).

Optionally, the calls router 270 forwards the event report record created for one or more of the incoming emergency calls to the selected dispatch center, i.e. to the selected EDU(s) 280. The selected EDU(s) 280 may use the event report record(s), specifically the sensory data, the identification data, the priority score, the reliability score and/or the textual description included in the event report record(s) for a plurality of uses. For example, the selected EDU(s) 280 may present to one or more dispatchers the sensory data relating to the reported emergency event and/or identification data relating to the reporter(s) 204. The selected EDU(s) 280 may further present to one or more dispatchers the textual representation to allow the dispatcher(s) to quickly identify the potential emergency event(s) and take action(s) accordingly. In another example, the selected EDU(s) 280 may use the priority score and/or the reliability score to prioritize the incoming emergency calls and/or the like.

It is expected that during the life of a patent maturing from this application many relevant systems, methods and computer programs will be developed and the scope of the terms peripheral devices, sensors and big data analytics tools are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of automatically routing incoming emergency calls to selected emergency dispatch centers, comprising:
   using at least one processor for:
   detecting at least one of a plurality of incoming emergency calls received from at least one client device;
   acquiring, via a communication network, sensory data captured by at least one sensor associated with the at least one client device and monitoring an environment of the at least one client device;
   analyzing the sensory data to identify at least one environment parameter deduced from the analysis; and
   automatically routing the at least one incoming emergency call to a selected one of a plurality of emergency dispatch centers according to the at least one environment parameter.

2. The computer implemented method of claim 1, wherein the at least one environment parameter is a member of a group consisting of: a parameter related to the at least one client device, a parameter related to a user of the at least one client device, a parameter related to interaction between the user and the at least one client device and a parameter related to a surroundings of the at least one client device.

3. The computer implemented method of claim 1, wherein the at least one sensor is a member of a group consisting of: an imaging sensor, an audio sensor, a geolocation sensor, a motion sensor and a physical condition sensor monitoring a user of the at least one client device.

4. The computer implemented method of claim 1, wherein the at least one sensor is integrated in the at least one client device.

5. The computer implemented method of claim 1, further comprising the at least one sensor is integrated in at least one peripheral device associated with a user of the at least one client device and operatively communicating with the at least one client device through at least one communication channel.

6. The computer implemented method of claim 1, further comprising the sensory data is continuously collected from the at least one sensor and stored by the at least one client device regardless of initiation of the at least one incoming emergency call.

7. The computer implemented method of claim 1, further comprising the at least one environment parameter is identified by the at least one client device.

8. The computer implemented method of claim 1, further comprising applying at least one trained machine learning algorithm to classify the at least one environment parameter to a respective one of a plurality of potential emergency events, the routing of the at least one incoming emergency call is based on selecting a dispatch center estimated as most suitable to respond to the respective potential emergency event estimated for the at least one incoming emergency call.

9. The computer implemented method of claim 1, further comprising acquiring identification data from the at least one client device in conjunction with the sensory data, the identification data comprising at least one member of a group consisting of: an age of a user of the at least one client device, a gender of the user, a name of the user, a telephone number associated with the at last one client device and an indication of a destination of the at least one incoming emergency call.

10. The computer implemented method of claim 9, further comprising routing the at least one incoming emergency call based on comparison of at least some of the identification data with stored identification data collected during at least one previous incoming emergency call.

11. The computer implemented method of claim 1, further comprising routing the at least one incoming emergency call according to a correlation of the at least one incoming emergency call with at least one another incoming emergency call received from at least one another client device based on a common geolocation parameter identified for both the at least one incoming emergency call and the at least one another incoming emergency call.

12. The computer implemented method of claim 1, further comprising routing the at least one incoming emergency call according to a predefined static routing associating at least one dialed number identified for the at least one incoming emergency call with at least one of the plurality of emergency dispatch centers.

13. The computer implemented method of claim 1, further comprising generating an event report record and associating the event report record with the at least one incoming emergency call, the event report record comprising at least some of the sensory data is forwarded to the selected dispatch center.

14. The computer implemented method of claim 13, further comprising the event report record comprising at least some identification data acquired from the at least one client device.

15. The computer implemented method of claim 13, further comprising the event report record comprises a priority score calculated for the at least one incoming emergency call based on the at least one environment parameter.

16. The computer implemented method of claim 13, further comprising the event report record comprises a reliability score calculated for the at least one incoming emergency call based on at least one previous emergency call received from a user of the at least one client device.

17. The computer implemented method of claim 13, further comprising the event report record comprises a textual representation of at least one emergency event estimated based on the at least one environment parameter.

18. A system for automatically routing incoming emergency calls to selected emergency dispatch centers, comprising:
- a program store storing a code; and
- at least one processor coupled to the program store for executing the stored code, the code comprising:
  - code instructions to detect at least one of a plurality of incoming emergency calls received from at least one client device;
  - code instructions to acquire, via a communication network, sensory data captured by at least one sensor associated with the at least one client device and monitoring an environment of the at least one client device;
  - code instructions to analyze the sensory data to identify at least one environment parameter deduced from the analysis; and
  - code instructions to automatically route the at least one incoming emergency call to a selected one of a plurality of emergency dispatch centers according to the at least one environment parameter.

* * * * *